MAGNETIC RECORDING AND REPRODUCING APPARATUS

Filed Dec. 19, 1969 6 Sheets-Sheet 1

May 23, 1972 SUKEYOSHI FUJIKAWA ET AL 3,664,672

MAGNETIC RECORDING AND REPRODUCING APPARATUS

Filed Dec. 19, 1969 6 Sheets-Sheet 2

MAGNETIC RECORDING AND REPRODUCING APPARATUS

MAGNETIC RECORDING AND REPRODUCING APPARATUS

Filed Dec. 19, 1969 6 Sheets-Sheet 6

United States Patent Office 3,664,672

Patented May 23, 1972

3,664,672

MAGNETIC RECORDING AND REPRODUCING APPARATUS

Sukeyoshi Fujikawa and Yasuhiro Uemura, Tokyo, Japan, assignors to Teac Corporation, Tokyo, Japan Filed Dec. 19, 1969, Ser. No. 886,469

Claims priority, application Japan, Dec. 25, 1968, 43/94,663, 43/94,664; Apr. 3, 1969, 44/25,476, 44/25,477

Int. Cl. G11b *15/26*

U.S. Cl. 274—4 D 7 Claims

ABSTRACT OF THE DISCLOSURE

A magnetic recording and reproducing apparatus wherein a pinch roller mounted on a pinch roller arm is disposed into or out of rotational contact with a capstan for transporting a magnetic tape unwound from a reel mounted on a reel shaft, with said magnetic tape being held between said pinch roller and said capstan, wherein when a plunger is energized, said pinch roller is brought into rotational contact with said capstan by means of a spring interposed directly or indirectly between an operating lever of said plunger and said pinch roller arm, with said magnetic tape being held between said pinch roller and said capstan, wherein an idler which is adapted to be disposed in and out of contact with a driving source is brought into rotational contact with a reel shaft wheel provided on the reel shaft or the reel shaft is connected to the driving source through said idler and rotary frictional engagement means, and said idler and said rotary frictional engagement means are utilized as means for imparting a back tension to the magnetic tape and means for braking said reel shaft, and wherein the in-contact or out-of-contact relationship between said pinch roller and said capstan is secured by a locking mechanism associated with the operating lever of the plunger.

BACKGROUND OF THE INVENTION

Field of the invention

This invention relates to a magnetic recording and reproducing apparatus, and more particularly it pertains to a novel mechanism wherein a magnetic tape is transported to the left or right so that signals are recorded thereon or reproduced therefrom.

Description of the prior art

In the conventional magnetic recording and reproducing apparatus, the mechanism for transporting a magnetic tape to the left or right is much complicated and large-sized. Especially, the mechanism for driving and controlling the reel shaft and mechanism for disposing the pinch roller into or out of rotational contact with the capstan are extremely complicated.

SUMMARY OF THE INVENTION

Accordingly, it is an object of the present invention to provide a simplified and small-sized mechanism for transporting a magnetic tape to the left or right.

Another object of the present invention is to provide a magnetic recording and reproducing apparatus wherein the reel shaft driving mechanism is effectively utilized to dispose the pinch roller into or out of contact with the capstan, thereby greatly reducing the number of parts of the mechanism for disposing the pinch roller into or out of contact with the capstan.

A further object of the present invention is to provide a magnetic recording and reproducing apparatus wherein a required back tension can be imparted to a magnetic tape, which is being transported, with a simple mechanism.

A still further object of the present invention is to provide a magnetic recording and reproducing apparatus wherein the braking of the reel shaft which is required in order to stop the magnetic tape from being transported can be achieved with a simple mechanism.

Other objects, features and advantages of the present invention will become apparent from the following description taken in conjunction with the accompanying drawings.

BRIEF DESCRIPTION OF THE DRAWINGS

FIGS. 1 to 3 show the magnetic recording and reproducing apparatus according to an embodiment of the present invention, wherein FIG. 1 is a schematic plan view showing the "stop" mode thereof, FIG. 2 is a schematic plan view showing the "leftward play" mode thereof and FIG. 3 is a schematic plan view showing the "rightward play" mode thereof; and FIGS. 4 to 6 show the magnetic recording and reproducing apparatus according to a second embodiment of the present invention, wherein FIG. 4 is a schematic plan view showing the "stop" mode thereof, FIG. 5 is a schematic plan view showing the "leftward play" mode thereof, and FIG. 6 is a schematic plan view showing the "rightward play" mode thereof.

DESCRIPTION OF THE PREFERRED EMBODIMENTS

With reference to the drawings, the present invention will be described as embodied in a two-way magnetic recording and reproducing apparatus by way of example.

Figure 1:
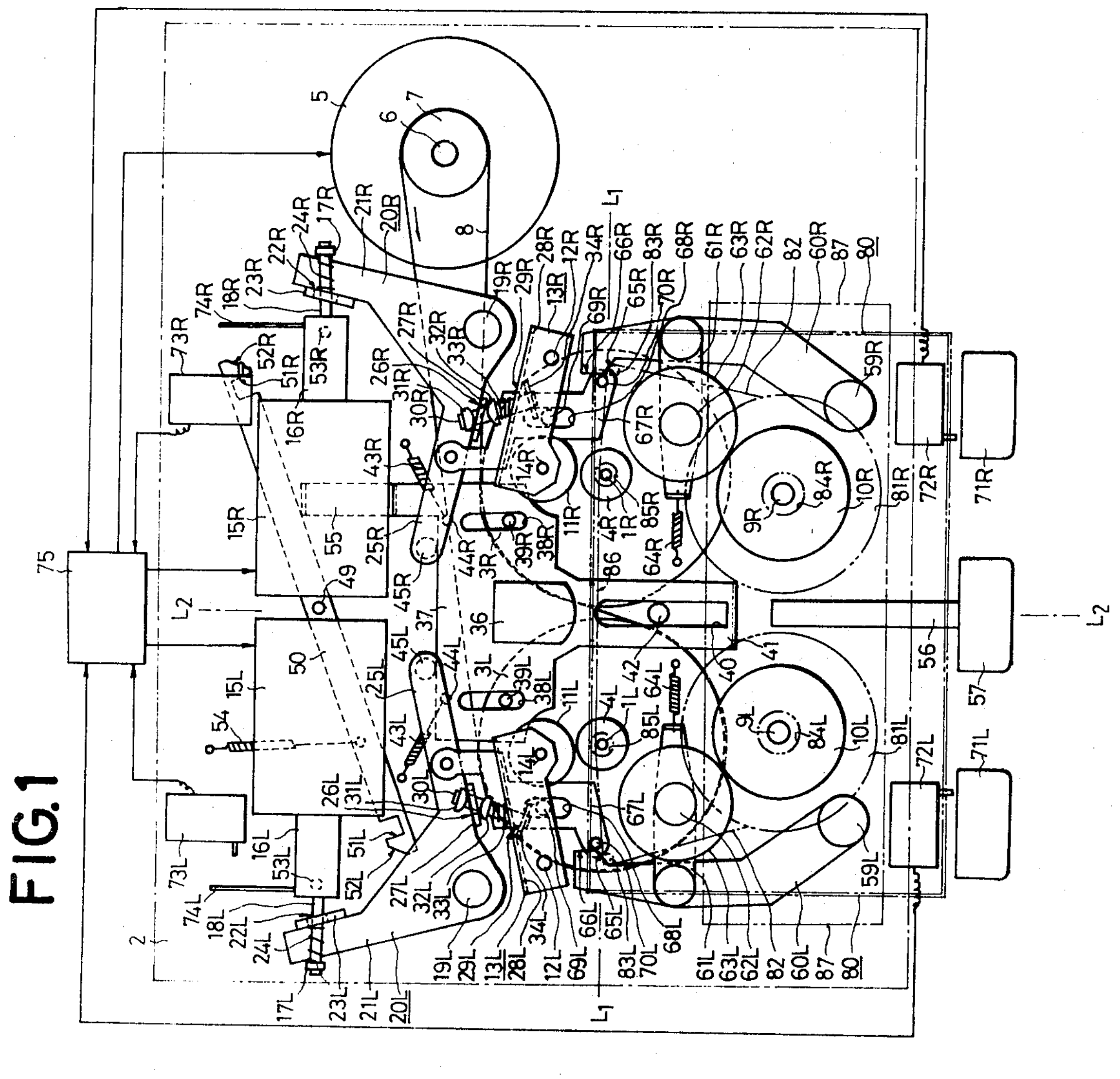
Figure 2:
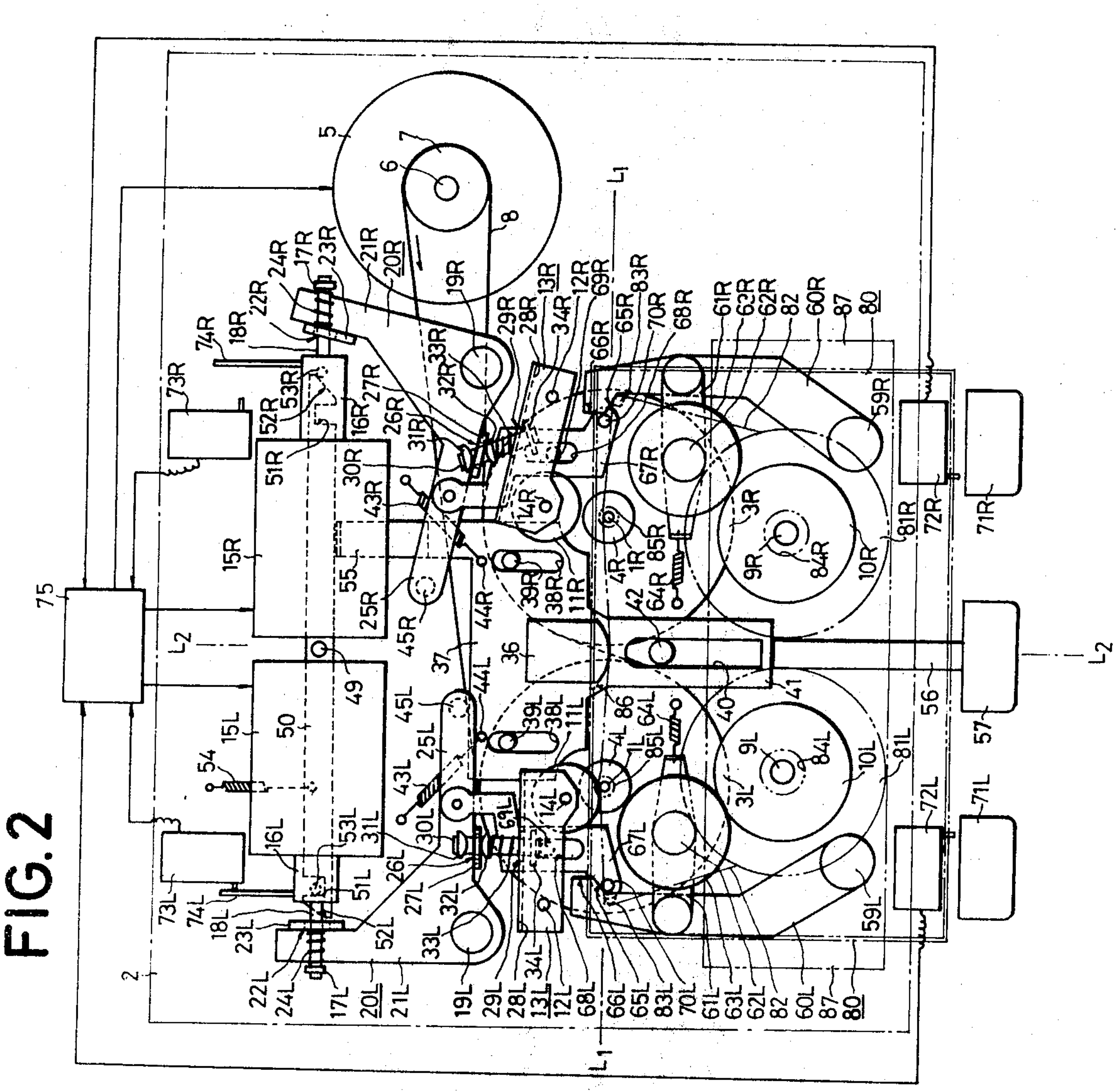
Figure 3:
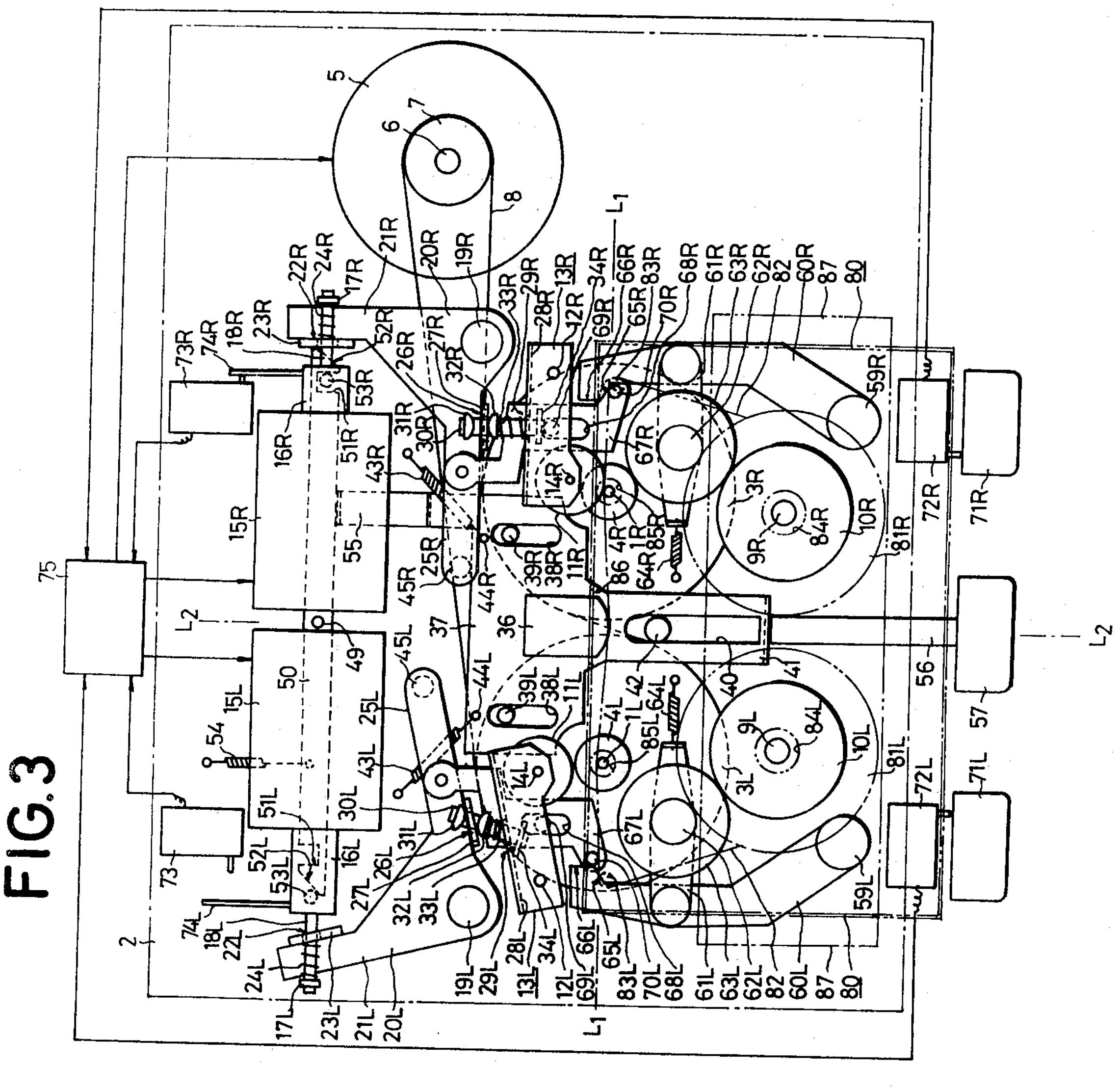

Referring first to FIGS. 1 to 3, there is shown a first embodiment of the present invention, wherein 1L and 1R represent left and right capstan shafts each having an equal diameter which are rotatably provided on a base plate 2 indicated by an alternate long and short dash line, respectively. Left and right capstan wheels 3L and 3R each having an equal diameter are attached to those portions of the left and right capstan shafts 1L and 1R which extend below the base plate 2, respectively, and left and right wheels 4L and 4R each having an equal diameter are attached to those portions of the left and right capstan shafts 1L and 1R which extend above the base plate 2 respectively. The capstans 1L and 1R lie on a transverse phantom line $L_1$—$L_1$.

Numeral 5 represents an electric motor which is fixedly provided below the base plate 2 at the right hand side thereof for example. A pulley 7 is attached to the rotary shaft 6 of the motor 5, and a belt 8 is provided between the pulley 7 and the left capstan wheel 3L. The outer surface of the front side portion of the belt 8 extending between the pulley 7 and the left capstan wheel 3L is disposed in contact with the right capstan wheel 3R through part of the rotational angular range of the latter. Thus, when the rotary shaft 6 of the motor 5 rotates anti-clockwise, the left capstan wheel 3L, left wheel 4L and left capstan 1L are rotated anti-clockwise, whereas the right capstan wheel 3R, right wheel 4R and right capstan 1R are rotated clockwise.

Consider another phantom line $L_2$—$L_2$ extending through the center position between the capstans 1L and 1R lying on the phantom line $L_1$—$L_1$ perpendicularly with respect to the latter. Left and right reel shafts 9L and 9R are rotatably mounted on the base plate 2 in such a manner as to upwardly project out of the base plate and symmetrically with respect to the phantom line $L_2$—$L_2$ with the latter located therebetween. Left and right reel shaft wheels 10L and 10R are attached to the left and right reel shafts 9L and 9R at the same level as the left and right wheels 4L and 4R, respectively.

11L and 11R indicate left and right pinch rollers respectively which are rotatably mounted on the free ends of pinch roller arms 13L and 13R pivoted to shafts 12L and 12R provided on the base plate 2, respectively. By rotating the arms 13L and 13R clockwise and anti-clockwise respectively, the pinch rollers 11L and 11R are brought into rotational contact with the capstans 1L and 1R respectively, whereas by rotating the arms 13L and 13R anti-clockwise and clockwise respectively, these pinch rollers 11L and 11R are disposed out of contact with the capstans 1L and 1R respectively. The pinch rollers 11L and 11R are positioned symmetrically with respect to the line $L_2$—$L_2$ with the latter located therebetween. Solenoids 15L and 15R are fixedly provided on the base plate 2 at the rear side thereof symmetrically with respect to the line $L_2$—$L_2$ with the latter located therebetween. Plungers 16L and 16R of the solenoids 15L and 15R extend to the left and the right respectively. Attached to the free ends of the plungers 16L and 16R are engaging pieces 18L and 18R which are provided with flanges 17L and 17R respectively.

Left and right L-shaped rotary arms 20L and 20R are pivotally attached to shafts 19L and 19R provided on the base plate 2 forwardly of the solenoids 15L and 15R symmetrical each other about the line $L_2$—$L_2$ and rearwardly of the shafts 12L and 12R having the arms 13L and 13R attached thereto respectively. Projections 23L and 23R having through-apertures 22L and 22R formed therein respectively are attached to rearwardly extending plate-like portions 21L and 21R of the rotary arms 20L and 20R. The engaging pieces 18L and 18R of the operating levers 16L and 16R are inserted through the apertures 22L and 22R of the projections 23L and 23R respectively. Interposed between the flanges 17L and 17R on the engaging pieces 18L and 18R and the projections 23L and 23R are springs 24L and 24R respectively through which the rotary arms 20L and 20R are connected with the engaging pieces 18L and 18R of the plungers 16L and 16R associated with the solenoids 15L and 15R, respectively. Thus, when the solenoids 15L and 15R are energized, the plungers 16L and 16R are displaced to the right and the left respectively, so that the arms 20L and 20R are rotated clockwise and anti-clockwise through the springs 24L and 24R respectively. Anti-clockwise and clockwise rotations of the arms 20L and 20R will result in the plungers 16L and 16R being returned to the original positions respectively.

Projections 27L and 27R having through-apertures 26L and 26R formed therein are attached to rightwardly and leftwardly extending plate-like portions 25L and 25R of the rotary arms 20L and 20R at intermediate positions thereof, respectively. Formed in upper plate-like portions 28L and 28R of the pinch roller arms 13L and 13R are through-apertures 29L and 29R which correspond to projections 27L and 27R respectively. Connecting rods 30L and 30R are inserted through the apertures 26L and 26R formed in the projections 27L and 27R of the rotary arms 20L and 20R and apertures 29L and 29R formed in the pinch roller arms 13L and 13R, respectively. Flanges 31L, 32L and 31R, 32R are provided on the connecting rods 30L and 30R at the opposite end positions thereof, with the projections 27L and 27R of the arms 20L and 20R located therebetween. Springs 33L and 33R are interposed between the flanges 32L and 32R of the connecting rods 30L and 30R and the upper plate-like portions 28L and 28R of the arms 13L and 13R, respectively. Return flanges 34L and 34R are attached to the connecting rods 30L and 30R below the upper plate-like portions 28L and 28R of the arms 13L and 13R, respectively. Thus, by rotating the arms 20L and 20R clockwise and anti-clockwise respectively, the arms 13L and 13R are rotated clockwise and anti-clockwise through the flanges 32L and 32R and springs 33L and 33R respectively, so that the pinch rollers 11L and 11R are brought into contact with the capstans 1L and 1R because of the resiliency of the springs 33L and 33R respectively. On the other hand, by rotating the arms 20L and 20R anti-clockwise and clockwise respectively, the arms 13L and 13R are rotated anti-clockwise and clockwise through the flanges 31L and 31R, connecting rods 30L and 30R and flanges 34L and 34R respectively, so that the pinch rollers 11L and 11R are disposed out of contact with the capstans 1L and 1R and returned to their original positions.

Provided on the base plate 2 is a bed plate 37 of which the longitudinal axis is in registry with the line $L_2$—$L_2$ and on which is mounted a magnetic head 36. The magnetic head 36 has its gap face positioned forwardly and is mounted on the bed plate 37 slightly rearwardly of the line $L_1$—$L_1$ at a level which substantially corresponds to the level of the capstans 1L and 1R. Formed in the left and right hand side portions of the bed plate 37 are transversely extending windows 38L and 38R through which are loosely inserted pins 39L and 39R provided on the base plate 2. An integral lever 41 extends from the bed plate 37, and it has a window 40 formed therein through which is loosely inserted a pin 42 provided on the base plate 2. Springs 43L and 43R one end of which is fixed to the base plate 2 has the other ends thereof coupled to pins 44L and 44R provided on the bed plate 37, so that the bed plate 37 is rearwardly biased under the coaction of the springs 43L and 43R.

Pins 45L and 45R are provided on the plate-like portions 25L and 25R of the rotary arms 20L and 20R respectively. The pins 45L and 45R are disposed in contact with the rear end surface of the bed plate 37. When the left and right solenoids 15L and 15R are energized and the plungers 16L and 16R thereof are locked so that the rotary arms 20L and 20R are rotated clockwise and anti-clockwise respectively, the bed plate 37 will be forwardly pressed and slid against the springs 43L and 43R by the pins 45L and 45R. In such a state, when the solenoids 15L and 15R are de-energized so that the plungers 16L and 16R are unlocked, the bed plate 37 will be rearwardly slid and returned to its original position by the springs 43L and 43R. Then, the pins 45L and 45R will be rearwardly pushed by the bed plate 37 so that the arms 20L and 20R will be rotated anti-clockwise and clockwise respectively. Thus, the plungers 16L and 16R will be returned to their original positions.

A shaft 49 is provided on the base plate 2 on the line $L_2$—$L_2$ intermediate between the solenoids 15L and 15R, and a locking lever 50 is pivotally mounted on the shaft 49. A U-shaped notch 51L is formed in the rear side face of the left hand side end portion of the locking lever 50, and an inverted U-shaped notch 51R is formed in the front side face of the right hand side end portion thereof. Further, formed in the left end portion of the lever 50 is a tapered face 52L tapering from the left hand side of the notch 51L toward the front, and formed in the right end portion of the lever 50 is a tapered face 52R tapering from the right hand side of the notch 51R toward the back. The plungers 16L and 16R of the solenoids 15L and 15R are provided with pins 53L and 53R which are adapted for engagement with the notches 51L and 51R of the locking lever 50 respectively.

Assume now that the plungers 16L and 16R of the solenoids 15L and 15R assume the leftward and rightward positions. In such a state, if the solenoid 15L (or 15R) is energized so that the plunger 16L (or 16R) is displaced to the rightward (or leftward) position, and the locking lever 50 is rotated clockwise, then the notch 51L (or 51R) formed in the lever 50 will be disposed in engagement with the pin 53L (or 53R). Under such a condition, if the solenoid 15L (or 15R) is de-energized, then the pin 53L (or 53R) will be brought into abutting relationship with the left hand side wall (or right hand side wall) of the notch 51L (or 51R) so that the plunger 16L (or 16R) will be locked at that position. Thus, the pinch roller 11L (or 11R) will be disposed in contact with the capstan 1L (or 1R) and maintained in such a state through the rotary arm 20L (or 20R) and spring 33L (or 33R), as shown in FIG. 2 (or FIG. 3). At this point, the pin 53R (or 53L) provided on the plunger 16R (or 16L) of the solenoid 15R (or 15L) is disposed in contact with or adjacent to the tapered face 52R (or 52L).

If the soleoid 15R (or 15L) is energized while the pinch roller 11L (or 11R) is being kept in rotational contact with the capstan 1L (or 1R) by the locking lever 50 as shown in FIG. 2 (or FIG. 3), then the plunger 16R (or 16L) thereof will be located at the leftward (or rightward) position. At the same time, the pin 53R (or 53L) will be slid on the tapered face 52R (or 52L) of the lever 50 so that the lever 50 will be turned clockwise with a result that the pin 53L (or 53R) will be disengaged from the notch 51L (or 51R) while the pin 53R (or 53L) will be located in the notch 51R (or 51L). In such a state, if the solenoid 15R (or 15L) is de-energized, then the pin 53R (or 53L) will be locked in that position so that the pinch roller 11R (or 11L) will be kept in rotational contact with the capstan 20R (or 20L) and spring 33R (or 33L) as shown in FIG. 3 (or FIG. 2) and described above in connection therewith. A weak spring 54 is interposed between the left side portion, for example, of the locking lever 50 and the base plate 2, whereby the lever is biased clockwise.

The bed plate 37 is provided with an engaging lever 55 which extends from the right hand side rear end portion thereof rearwardly, below the base place 2 and further rearwardly. The free end of the lever 55 is adapted to be disposed in contact or close opposing relationship with the front face of the right hand side portion of the lever 50 as the pins 531 and 53R are disposed in engagement with the notches 51L and 51R of the lever 50 so that the pinch rollers 11L and 11R are kept in rotational contact with the capstans 1L and 1R respectively as described above in connection with FIGS. 2 and 3. The front free end of the lever 41 provided on the bed plate 37 is bent in such a manner as to extend downwardly of the base plate 2. A lever 56 slidable perpendicularly to the line $L_1$—$L_1$ is provided in such a manner as to extend below the base plate 2 on the line $L_2$—$L_2$ in opposing relationship to the bent free end of the lever 41. A button 57 is provided on the front free end of the lever 56. By depressing this button 57, the bed plate 37 will be slid rearwardly, so that the lever 50 will be rotated anti-clockwise against the spring 54 and the pins 53L or 53R will be disengaged from the notches 51L or 51R respectively. Thus, the apparatus will be returned to such a state as shown in FIG. 1.

There are provided rotary arms 60L and 60R having one end thereof pivoted to shafts 59L and 59R provided on the base plate 2 outwardly and forwardly of the reel shafts 9L and 9R and symmetrically with respect to the line $L_2$—$L_2$ with the latter located therebetween. These rotary arms 60L and 60R extend rearwardly through the left and right hand sides of the reel shafts 9L and 9R as far as the neighborhood of the line $L_1$—$L_1$, respectively. Transversely extending rotary arms 61L and 61R are provided between the capstan 1L and the reel shaft 9L and the capstan 1R and the reel shaft 9R respectively. Left and right idlers 63L and 63R are rotatably mounted on shaft 62L and 62R provided on the rotary arms 61L and 61R, respectively. The rotary arms 61L and 61R have one end thereof pivoted to the arms 60L and 60R at intermediate positions thereof respectively. The other ends of the rotary arms 61L and 61R are connected to springs 64L and 64R having one end thereof fixed to the base plate 2. The rotary arms 61L and 61R are rotationally biased by the springs 64L and 64R so that the idlers 63L and 63R are always disposed in rotational contact with the fly-wheels 10L and 10R of the reel shafts 9L and 9R, respectively. In this case, the arms 60L and 60R are rotationally biased clockwise and anti-clockwise through the arms 61L and 61R by the springs 64L and 64R, respectively.

Provided on the left and right side surfaces of the free ends of the rotary arms 60L and 60R are tapered faces 65L and 65R projecting therefrom to the right and the left and tapering toward the back respectively, and faces 66L and 66R contiguous thereto which extend backwardly. Connecting rods 67L and 67R are provided between positions corresponding to the tapered faces 65L and 65R and the plate-like portions 25L and 25R of the rotary arms 20L and 20R, respectively. These connecting rods 67L and 67R are formed with longitudinally extending windows 68L and 68R through which are loosely inserted pins 69L and 69R provided on the base plate 2.

The connecting rods 67L and 67R have the rear ends thereof pivoted to the plate-like portions 25L and 25R of the arms 20L and 20R respectively. Pins 70L and 70R are provided on the front ends of the connecting rods 67L and 67R. Assume now that arms 20L and 20R have been located at the original positions where they have been rotated anti-clockwise and clockwise respectively as shown in FIG. 1. Then, the pins 70L and 70R of the connecting rods 67L and 67R will have been disposed in contact with the faces 66L and 66R of the arms 60L and 60R respectively. In such a state, if the arms 60L and 60R are rotated anti-clockwise and clockwise respectively, then the idlers 63L and 63R mounted on the arms 61L and 61R will be disposed out of contact with the capstan wheels 4L and 4R. At this point, if the plungers 15L and 15R are energized so that the arm 20L (or 20R) is turned clockwise (or anti-clockwise), then the pin 70L (or 70R) of the lever 67L (or 67R) will be slid on the tapered face 65L (or 65R) of the arm 60L (or 60R) so as to be brought into contact with the right hand side surface (or left hand side surface). Thus, the arm 60L (or 60R) will be rotated by the spring 64L (or 64R), so that the idler 63L or 63R) will be disposed into rotational contact with the wheel 4L (or 4R).

Further, buttons 71L and 71R are slidably provided below the base plate 2 in juxtaposition with the aforementioned button 57. Also provided below the base plate 2 in opposing relationship to the buttons 71L and 71R are micro switches 72L and 72R which are adapted to be closed by depressing the buttons 71L and 71R respectively.

Another pair of micro switches 73L and 73R are provided on the base plate 2 in opposing relationship to the plungers 16L and 16R of the aforementioned solenoids 15L and 15R, respectively. Engaging pieces 74L and 74R extend from the plungers 16L and 16R respectively. The micro switches 73L and 73R are adapted to be closed when the solenoids 15L and 15R are energized so that the plungers 16L and 16R are brought to the rightward and leftward positions respectively.

Numeral 75 represents a power source circuit for driving the electric motor 5 and solenoids 15L and 15R. The aforementioned switches 72L, 72R and 73L, 73R are connected with the power source circuit 75 which is adapted to supply power to the solenoids 15L and 15R when the switchets 72L and 72R are closed respectively. Upon closure of the switches 73L and 73R, power is supplied from the power source circuit 75 to the electric motor 5.

A tape magazine 80 is loaded in the foregoing construction embodying the present invention as indicated by an alternate long and two short dashed line for example.

This tape magazine per se is well known in the art, and it contains a pair of reels 81L and 81R between which a magnetic tape 82 extends. The magnetic tape 82 is guided by guide members 83L and 83R. The tape magazine 80 is formed with reel shaft inserting apertures 84L and 84R at the positions corresponding to the shaft apertures of the reels 81L and 81R, respectively. Further, the tape magazine 80, is provided with capstan shaft inserting apertures 85L and 85R on the side of the reels along the passage of the magnetic tape 82 between the guide members 83L and 83R, and with a window 86 at least in the center of the front end surface. The tape magazine 80 is loaded on a support plate 87 provided on the base plate 2, with the reel shafts 9L and 9R being inserted in the reel shaft apertures (not shown) of the reels 81L and 81R through the reel shaft inserting apertures 84L and 84R and the capstans 1L and 1R being inserted through the capstan shaft inserting apertures 85L and 85R.

With the foregoing arrangement, in such a state as shown in FIG. 1, by depressing the button 71L (or 71R) after the tape magazine 80 has been loaded on the support plate 87, the solenoids 15L (or 15R) will be energized so that the pinch roller 11L (or 11R) will be brought into rotational contact with the capstan 1L (or 1R) and at the same time the idler 63L (or 63R) will also be brought into rotational contact with the wheel 4L (or 4R), as described above in connection with FIG. 2 (or FIG. 3) This state will be locked by the locking lever 50. Upon energization of the solenoid 15L (or 15R), the switch 73L (or 73R) will be closed so that the motor 5 will be energized to simultaneously rotate the capstans 1L and 1R anti-clockwise and clockwise respectively after the button 71L (or 71R) has been depressed. At this point, the magnetic tape 82 will be transported to the left (or to the right) by the fact that the pinch roller 11L (or 11R) has been disposed in contact with the capstan 1L (or 1R). Furthermore, the reel shaft 9L (or 9R) will be rotated anticlockwise (or clockwise) by the fact that the idler 63L (or 63R) has been disposed in rotational contact with the wheel 4L (or 4R) as a result of the energization of the solenoid 15L (or 15R), so that the magnetic tape 82 will be wound onto the reel 81L (or 81R).

At this point, to supply a drag to tension the tape the idler 63R (or 63L) is disposed in rotational contact with the wheel 10R (or 10L) of the reel shaft 9R (or 9L) so that the magnetic tape 82 is unwound from the reel 81R (or 81L). That is, the idler 63R (or 63L) is being rotated by the wheel 10R (or 10L). Thus, a frictional force occurring between the idler 63R (or 63L) and the shaft 62R (or 62L) carrying the same acts as a braking force which results in a suitable back tension imparted to the magnetic tape 82.

Upon contact of the pinch roller 11L (or 11R) with the capstan 1L (or 1R), the bed plate 37 will be forwardly slid against the springs 43L and 43R by the pin 45L (or 45R) of the arm 20L (or 20R), so that the magnetic head 36 will be moved through the front window 86 and brought into contact with the magnetic tape 82 which is being transported to the left (or to the right) while being provided with the back tension as described above. Thus, by connecting the magnetic head 36 with the recording or reproducing electric circuit (not shown), it is possible to record a signal on the magnetic tape 82 or reproduce a signal recorded thereon.

By depressing the button 71R (or 71L) under the condition described above in connection with FIG. 2 (or FIG. 3), the solenoid 15R (or 15L) will be energized so that the pinch roller 11R (or 11L) will be disposed into contact with the capstan 1R (or 1L). Accordingly, the rotational contact of the pinch roller 11L (or 11R) with the capstan 1L (or 1R) which has been effected through the locking lever 50 will be released so that the pinch roller 11R (or 11L) will now be brought into rotational contact with the capstan 1R (or 1L) and the idler 63R (or 63L) will also be disposed in rotational contact with the wheel 4R (or 4L). Such a relationship will be locked. The energization of the solenoid 15R (or 15L) will result in the switch 73R (or 73L) being energized. (In this case, the switch 73L (or 73R) will be opened since the plunger 15L (or 15R) is returned to the original position.) Consequently, the electric motor 5 will be rotated so that the capstans 1L and 1R will be rotated as described above. At this time, however, the magnetic tape 82 will be transported at a constant speed to the right so as to be wound onto the reel 81R (or 81L), by the fact that the pinch roller 11R (or 11L) has been disposed in contact with the capstan 1R (or 1L).

In this case, too, a suitable back tension will be imparted to the magnetic tape 82 because of the fact that the idler 63L (or 63R) is spaced apart from the wheel 4L (or 4R) of the supply reel 81L (or 81R). Also, since the bed plate 37 is forwardly slid by the pin 45R (or 45L) of the arm 20R (or 20L), the magnetic head 36 is brought into contact with the magnetic tape 82 which is being transported to the right (or to the left) so that a signal can be recorded or reproduced thereby.

If the button 57 is depressed while a signal is being recorded on or reproduced from the magnetic tape 82 being transported to the left or right, then the bed plate 37 will be rearwardly slid as described above, so that the locking lever 50 will be rotated by the engaging member 55. Thus, the pinch roller 11L or 11R will be separated from the capstan 1L or 1R. As a result, the locked state will be released in which the pinch roller 11L or 11R has been disposed in rotational contact with the capstan 1L or 1R and the idler 63L or 63R has been disposed in rotational contact with the wheel 4L or 4R. In this way, the respective parts will be returned to the positions as shown in FIG. 1, so that the electric motor 5 will be stopped. Thus, the apparatus will be stopped from operation.

The idlers 63L and 63R are disposed in rotational contact with the wheels 10L and 10R respectively when these idlers 63L and 63R are spaced apart from the wheels 4L and 4R. Therefore, although the reel wheels 10L and 10R tend to continue rotating due to the inertia thereof, frictional forces occurring on the shafts 62L and 62R of the idlers 63L and 63R will act as damping forces which will be imparted to the reel wheels 10L and 10R so that the latters will be quickly stopped from rotation.

With the foregoing simplified arrangement according to the present invention, a signal can be recorded on or reproduced from the magnetic tape which is transported to the left or right so as to be taken up by driving the take-up side reel shaft. It is also possible to switch the apparatus from the "record" or "reproduce" state to the "stop" state by stopping the magnetic tape. One of the great advantages of the present invention is such that it is possible to very easily produce a back tension or damping force, without providing any special means for imparting a back tension to the magnetic tape and any special braking means for braking the supply and take-up side rotary shafts.

Another great advantage of the present invention is such that the magnetic tape can be transported or stopped by disposing the pinch roller arms into or out of contact with the capstans through the association of the pinch roller arms with the rotary arms which may be associated with a mechanism for driving the reel shafts or the like.

In the foregoing, description has been made of the case where the springs 64L and 64R are connected to the free ends of the arms 61L and 61R thereby to always maintain the idlers 63L and 63R in contact with the wheels 10L and 10R respectively. However, it is also possible that biasing springs may be provided, instead of the springs 64L and 64R, between the arms 60L and 60R and arms 61L and 61R thereby to rotationally bias the arms 61L and 61R so as to cause the idlers 63L and 63R to be always disposed in rotational contact with the wheels 10L and 10R respectively and that the arms 60L and 60R may be made to assume rotational positions corresponding to those of the arms 20L and 20R, as will be readily apparent to those skilled in the art.

Furthermore, in the foregoing, description has been made of the case where the idlers 63L and 63R are disposed in rotational contact with the captsan wheels 4L and 4R provided on the capstan shafts 1L and 1R respectively. However, it is also possible that the capstan wheels 4L and 4R may be eliminated and that the idlers 63L and 63R may be disposed in direct contact with the capstan shafts 1L and 1R respectively, as will be apparent to those skilled in the art.

Still furthermore, in the foregoing, description has been made of the case where return flanges 31L, 29L and 31R, 29R are provided on the connecting rods 30L and 30R interposed between the rotary arms 20L and 20R and the pinch roller arms 13L and 13R respectively. However, it is also possible that such flanges may be omitted, that coil springs may be instead loaded on the shafts 12L and 12R having the pinch roller arms 13L and 13R pivoted thereto for example, and that such springs may be interposed between the arms 20L and 20R and the fixed portion thereby to rotationally bias the arms 20L and 20R anti-clockwise and clockwise respectively. Other various changes and modifications will become apparent to those skilled in the art.

Figure 4:
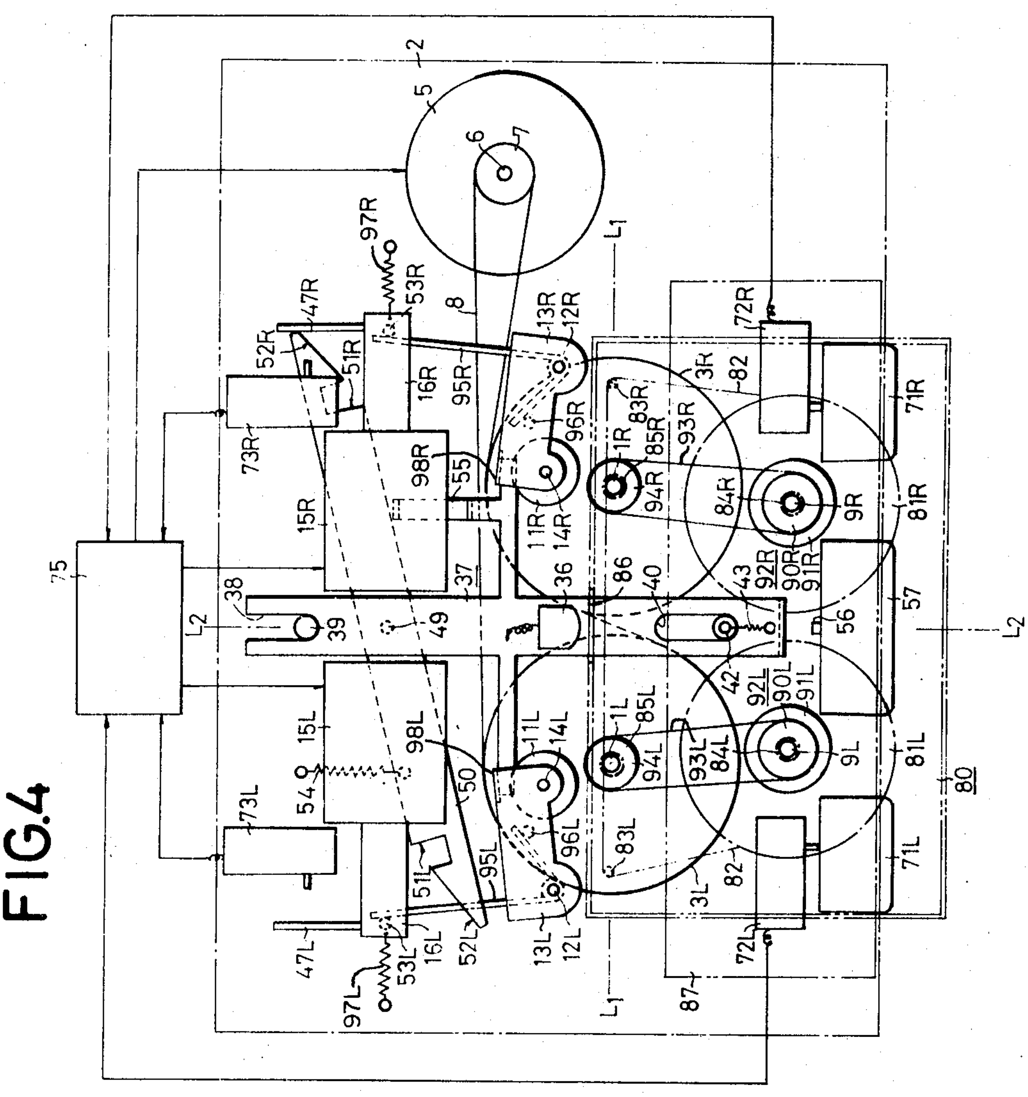
Figure 5:
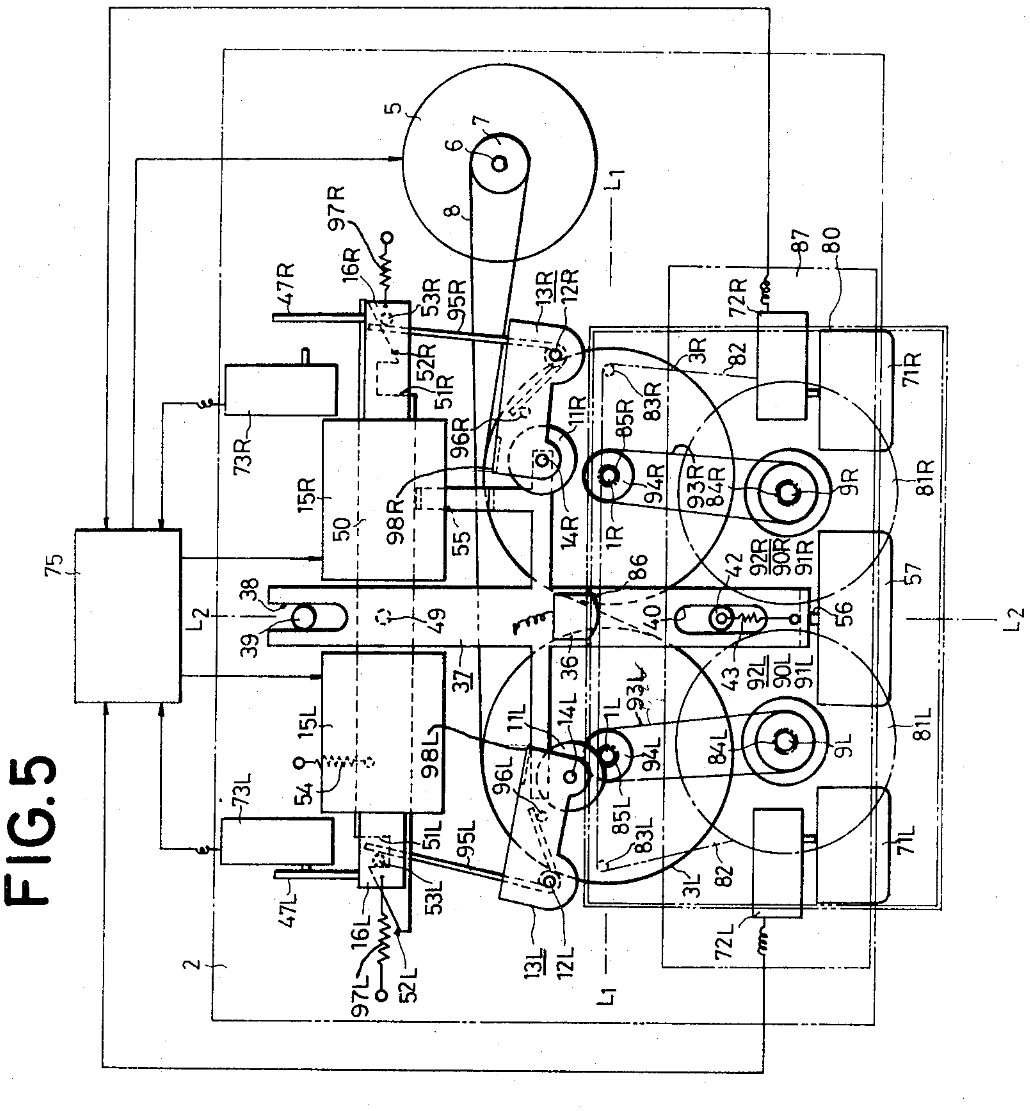
Figure 6:
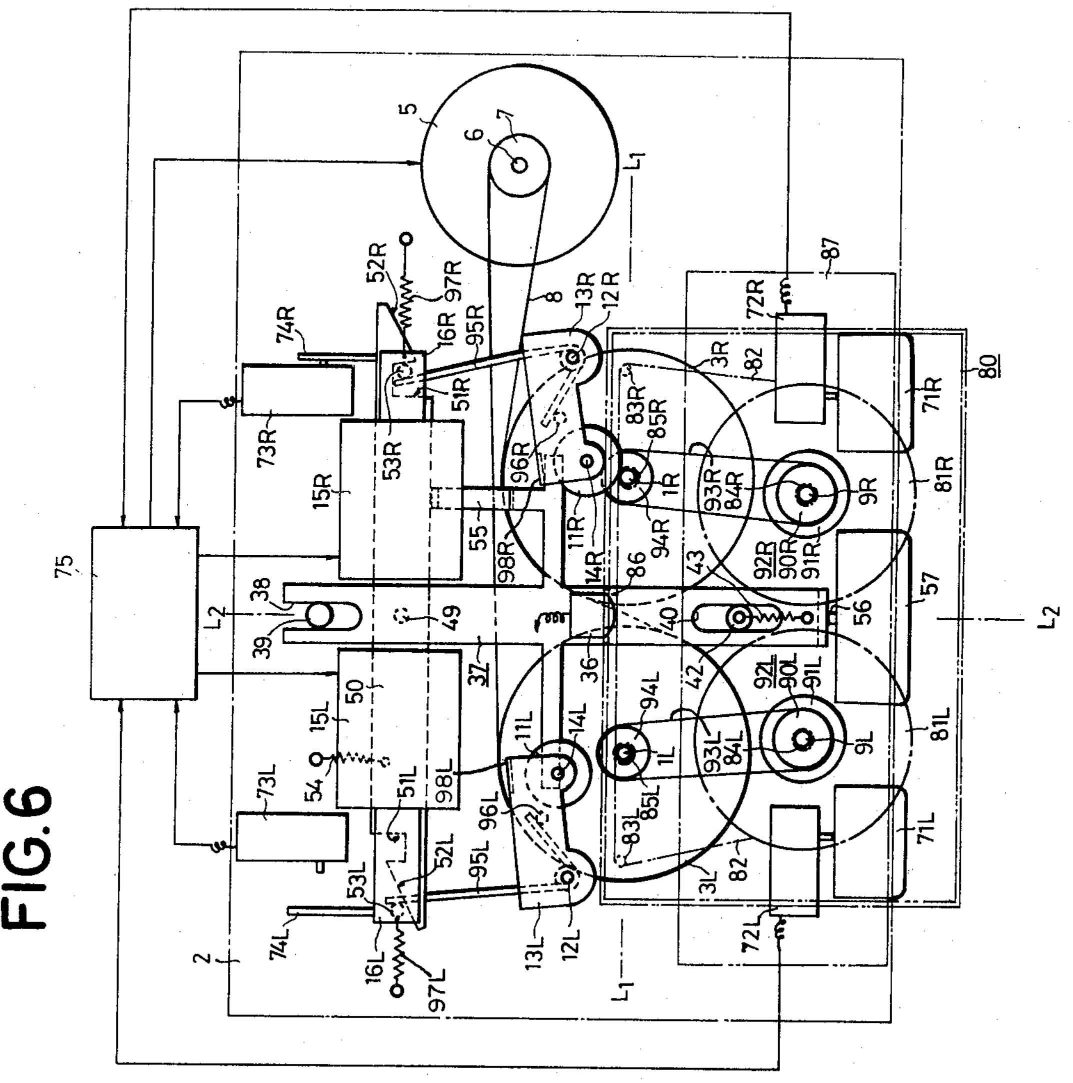

Referring now to FIGS. 4 to 6, there is shown another embodiment of the present invention, which is a modification to the embodiment described above in connection with FIGS. 1 to 3. In FIGS. 4 to 6, parts corresponding to those of FIGS. 1 to 3 are indicated by like numerals. As will be seen from the drawings, the difference of the embodiment shown in FIGS. 4 to 6 from that shown in FIGS. 1 to 3 resides in the mechanism for driving the reel shafts 9L and 9R and mechanism for disposing the pinch rollers 11L and 11R into or out of contact with the capstans 1L and 1R respectively.

In the embodiment shown in FIGS. 4 to 6, the reel shafts 9L and 9R are connected to friction plates 90L and 90R provided under the base plate 2, respectively. Further, rotary plates 91L and 91R are supported by shafts on the base plate 2 concentrically with respect to the rotary friction plates 90L and 90R, and they are adapted to be disposed in frictional contact with the friction plates 90L and 90R respectively. The rotary friction plate 90L and rotary plate 91L constitute rotary frictional engagement means 92L, and the rotary friction plate 90R and rotary plate 91R form another rotary frictional engagement means 92R. The rotary plates 91L and 91R are rotatably coupled to pulleys 94L and 94R provided on the capstan shafts 1L and 1R extending upwardly of the base plate, through belts 93L and 93R respectively. Thus, if the capstans 1L and 1R are simultaneously rotated anti-clockwise and clockwise respectively, then the reel shafts 9L and 9R will be simultaneously rotated anti-clockwise and clockwise at substantially the same speed and with substantially the same torque, respectively. Further, the plungers 16L and 16R are biased to the left and right by suitable springs 97L and 97R interposed between the free ends of the plungers 16L and 16R and the base plate 2.

Furthermore, coil springs 95L and 95R are loaded on the shafts 12L and 12R of the pinch roller arms 13L and 13R, with one free end of these springs engaged with pins 96L and 96R provided on the arms 13L and 13R respectively and the other free ends thereof engaged with the pins 53L and 53R provided on the plungers 16L and 16R respectively. When the solenoids 15L and 15R are energized (not simultaneously), the plungers 16L and 16R will be displaced to the right and left respectively so that the arms 13L and 13R will be rotated clockwise and anti-clockwise through the pins 53L and 53R, springs 95L and 95R and pins 96L and 96R. Thus, the pinch rollers 11L and 11R will be brought into rotational contact with the capstans 1L and 1R respectively. The bed plate 37 is slightly different in respect of configuration from that shown in FIGS. 1 to 3, but the former is essentially similar to the latter. In FIGS. 4 to 6, a spring indicated 43 corresponds to the springs 43L and 43R of FIGS. 1 to 3, and a guide notch and pin indicated at 38 and 39 correspond to the apertures 38L and 38R and pins 39L and 39R respectively.

With the arrangement shown in FIGS. 4 to 6, the tape magazine 80 is loaded on the support plate 87 in such a state as shown in FIG. 4, and thereafter the solenoid 15L (or 15R) will energized by depressing the button 71L (or 71R) so that the pinch roller 11L (or 11R) will be brought into rotational contact with the capstan 1L (or 1R). This state will be locked by the locking lever 50. The energization of the solenoid 15L (or 15R) will result in the switch 73L (or 73R) being closed so that the electric motor 5 will be rotated so as to simultaneously rotate the capstans 1L and 1R anti-clockwise and clockwise respectively after the button 71L (or 71R) has been depressed. At this point, the reel shafts 9L and 9R tend to simultaneously rotate anti-clockwise and clockwise respectively. In this case, however, the magnetic tape 82 is forcibly transported to the left (or to the right) while being held between the pinch roller 11L (or 11R) and the capstan 1L (or 1R). Since the reel shaft 9R (or 9L) is coupled to the electric motor 5 through rotary frictional engagement means 92R (or 92L), slip will be caused at the rotary frictional engagement means 92R (or 92L), so that the reel shaft 9R (or 9L) will be rotated anti-clockwise (or clockwise) to such an extend as to correspond to the quantity of the magnetic tape 82 which is transported to the left (or to the right). In this way, the magnetic tape 82 will be unwound from the reel 81L) and transported to the left (or to the right) at a constant speed while being provided with a back tension. The magnetic tape thus unwound will be wound onto the reel 81L (or 81R), passing between the capstan 1L (or 1R) and the pinch roller 11L (or 11R), by the anti-clockwise (or clockwise) rotation of the reel shaft 9L (or 9R). When the pinch roller 11L (or 11R) is brought into rotational contact with the capstan 1L (or 1R), tabs 98L (or 98R) of the pinch roller arms 13L or 13R engage the cross bar of the operating lever 37. The lever 37 is driven forwardly so that the magnetic tape 36 will be brought into contact with the magnetic tape 82 being transported to the left (or to the right) while being provided with a back tension, through the front window 86 formed in the magazine 80, as described above. Thus, by connecting the magnetic head 36 with the recording or reproducing electric circuit (not shown), it is possible to record a signal on the magnetic tape 82 or reproduce a signal therefrom.

Furthermore, if the button 71R (or 71L) is depressed in such a state as shown in FIG. 5 (or FIG. 6), then the solenoid 15R (or 15L ) will be energized so that the pinch roller 11R (or 11L) will be brought into rotational contact with the capstan 1R (or 1L). At the same time, the pinch roller 11L (or 11R) will be released from the contact with the capstan 1L (or 1R) through the locking lever 50, and now the pinch roller 11R (or 11L) will be locked in contact with the capstan 1R (or 1L). The energization of the solenoid 15R (or 15L) will result in the switch 73R (or 73L) being closed so that the electric motor 5 will be rotated. (In this case, the switch 73L (or 75R) will be opened because the plunger 16L (or 16R) is returned to the original position.) Consequently, the capstans 1L and 1R will be rotated as described above. At this time, the reel shafts 9L and 9R tend to simultaneously rotate anti-clockwise and clockwise respectively. In this case, however, the magnetic tape 82 is forcibly transported to the left (or to the right) while being held between the pinch roller 11R (or 11L) and the capstan 1R (or 1L). Since the reel shaft 9L (or 9R) is coupled to the electric motor 5 through the rotary frictional engagement means 92L (or 92R), slip will be caused at the rotary frictional engagement means 92L (or 92R), so that the reel shaft 9L (or 9R) will be rotated clockwise (or anti-clockwise) to such an extent as to correspond to the quantity of the magnetic tape 82 which is transported to the right (or to the left). In this way, the magnetic tape 82 will be unwound from the reel 81L (or 81R) and transported to the right (or to the left) at a constant speed while being provided with a back tension. The magnetic tape thus unwound will be wound onto the reel 81R (or 81L) passing between the capstan 1R (or 1L) and the pinch roller 11R (or 11L), by the clockwise (or anti-clockwise) rotation of the reel shaft 9R (or 9L). In this case, too, the operating lever 37 is slidden forwardly so that the magnetic head 36 is brought into the magnetic tape being transported to the right (or to the left). Thus, a signal can be recorded on the magnetic tape or reproduced therefrom.

If the push-button 57 is depressed while a signal is being recorded on or reproduced from the magnetic tape being transported to the right or left, then the lever 37 will be slidden rearwardly as described above so that the locking lever 50 will be rotated by the engaging piece 55. Thus, the locked state in which the pinch roller 11L or 11R is disposed in rotational contact with the capstan 1L or 1R is released with a result that the respective parts will be returned to the positions shown in FIG. 1. At the same time, the electric motor 5 will be stopped from rotation so that the apparatus will be brought into the "stop" state.

As will be appreciated from the foregoing, the embodiment shown in FIGS. 4 to 6 has such a great advantage that a back tension to be imparted to the magnetic tape can be very easily produced without requiring any special means, that is, without providing any special tensioning mechanism or parts and also without providing any special braking means for applying a back tension to the rotary shafts on the supply reel side. Furthermore, the magnetic tape can be instantly switched from the stopped state to the leftward or rightward transported state or from such transportated state to the rightward or leftward tansported state with the simplified arrangement, and also it can be immediately released from any such state.

The foregoing two embodiments of FIGS. 1 to 3 and FIGS. 4 to 6 have been illustrated and described only by way of example. It will be readily apparent that this invention can be applied not only to the cases where a signal is recorded on or reproduced from a magazine tape but also to the cases where a signal is recorded on or reproduced from an open reel tape.

We claim:

1. A magnetic recording and reproducting apparatus comprising:

(a) right and left reel shafts on which are mounted right and left reels for winding a magnetic tape thereon or unwinding said magnetic tape therefrom respectively;

(b) right and left capstans for transporting said magnetic tape to right and left respectively;

(c) means for driving said right and left capstans;

(d) right and left pinch rollers mounted on right and left pinch roller arms in such a manner as to be brought into or out of rotary contact with said right and left capstans with said magnetic tape being gripped therebetween respectively;

(e) magnetic head means mounted on a sliding plate for recording a signal on or reproducing a signal from said magnetic tape;

(f) a first spring means for biasing said sliding plate in a direction to hold said magnetic head means apart from said magnetic tape;

(g) right and left solenoids having operating plungers extending to right and left respectively, each of said operating plungers having a pin planted thereon;

(h) a locking lever pivotally mounted on a shaft located between said right and left solenoids, said locking lever having a U-shaped notch at one end portion and an inverted U-shaped notch at the other end portion thereof for engagement with said pins planted on said plungers of said right and left solenoids respectively;

(i) a second spring means for biasing said locking lever in a manner to engage said U-shaped and inverted U-shaped notches with said pins respectively;

(j) right and left actuating means for rotating said right and left pinch roller arms to bring said right and left pinch rollers into rotary contact with said right and left capstans respectively, said right and left actuating means being associated at one end to said plungers of said right and left solenoides respectively;

(k) said sliding plate having an engaging lever normally engaging said locking lever in a manner to disengage said U-shaped and inverted U-shaped notches from said pins respectively;

(l) each of said right and left actuating means having an engaging pin for sliding said sliding plate to urge said magnetic head means against said magnetic tape;

wherein said right (or left) solenoid is energized, (i) its plunger is moved to left (or right), by which said right (or left) actuating means is actuated to rotate said right (or left) pinch roller arm to bring said right (or left) pinch roller into rotary contact with said right (or left) capstan to thereby transport said magnetic tape from said left (or right) reel to said right (or left) reel;

(ii) by the actuation of said right actuating means, said sliding plate is pushed by said engaging pin or said right (or left) actuating means against said first spring means to urge said magnetic head means against said magnetic tape; and, (iii) by the sliding movement of said sliding plate, said locking lever is permitted to be rotated by said second spring means, whereby said pin on said plunger of said right (or left) solenoid is engaged with one of said notches of said locking lever corresponding thereto to lock said plunger of said right (or left) solenoid, said plunger being released from its locked condition by by sliding said sliding plate in a direction to disengage said magnetic head means from said magnetic tape in such a manner that said locking lever is pushed by said engaging lever of said sliding plate against said second spring means.

2. A magnetic recording and reproducing apparatus as claimed in claim 1, wherein said locking lever has tapered faces at both ends thereof for sliding contact with said pins respectively, one of said tapered faces extending from one free end face of said locking lever toward the outer upper end of said U-shaped notch and the other tapered face extending from the other free end face toward the outer lower end of said inverted U-shaped notch, and when said left (or right) solenoid is energized after said plunger of said right (or left) solenoid is brought into its locked condition, said pin on said plunger of said left (or right) solenoid is moved into sliding contact with one of said tapered faces corresponding thereto to rotate said locking lever against said second spring means to release said plunger of said right (or left) solenoid from its locked condition and then said pin on said plunger of said left (or right) solenoid is engaged with the other of said notches of said locking lever corresponding thereto to lock said plunger of said left (or right) solenoid.

3. A magnetic recording and reproducing apparatus as claimed in claim 1, wherein said right and left actuating means include springs respectively and said right and left pinch roller arms are rotated through said springs respectively when said right and left actuating means are actuated by the energization of said right and left solenoids.

4. A magnetic recording and reproducing apparatus comprising:

(a) right and left reel shafts on which are mounted right and left reels for winding a magnetic tape thereon or unwinding said magnetic tape therefrom respectively, (b) right and left capstans for transporting said magnetic tape to right and left respectively;
(c) means for driving said right and left capstans;
(d) right and left pinch rollers mounted on right and left pinch roller arms in such a manner as to be brought into or out of rotary contact with said right and left capstans with said magnetic tape being gripped therebetween respectively;
(e) magnetic head means mounted on a sliding plate for recording a signal on or reproducing a signal from said magnetic tape;
(f) a first spring means for biasing said sliding plate in a direction to hold said magnetic head means apart from said magnetic tape;
(g) right and left solenoids having operating plungers extending to right and left respectively, each of said plungers having a pin planted thereon;
(h) a locking lever pivotally mounted on a shaft located between said right and left solenoids, said locking lever having a U-shaped notch at one end portion and an inverted U-shaped notch at the other end portion thereof for engagement with said pins plated on said plungers of said right and left solenoids respectively;
(i) a second spring means for biasing said locking lever in a manner to engage said U-shaped and inverted U-shaped notches with said pins respectively;
(j) right and left actuating means for rotating said right and left pinch roller arms to bring said right and left pinch rollers into rotary contact with said right and left capstans respectively, said right and left actuating means being associated at one end to said plungers of said right and left solenoids respectively;
(k) said sliding plate having an engaging lever normally engaging said locking lever in a manner to disengage said U-shaped and inverted U-shaped notches from said pins respectively;
(l) each of said right and left pinch roller arms having an engaging piece for sliding said sliding plate to urge said magnetic head means against said magnetic tape;

wherein when said right (or left) solenoid is energized, (i) its operating plunger is moved to left (or right), by which said right (or left) actuating means is actuated to rotate said right (or left) pinch roller arm to bring said right (or left) pinch roller into rotary contact with said right (or left) capstan to thereby transport said magnetic tape from said left (or right) reel to said right (or left) reel;
(ii) by the actuation of said right actuating means, said sliding plate is pushed to slide by said engaging piece of said right (or left) pinch roller arm against said first spring means to urge said magnetic head means against said magnetic tape; and
(iii) by the sliding movement of said sliding plate, said locking lever is permitted to be rotated by said second spring means; whereby said pin on said plunger of said right (or left) solenoid is engaged with one of said notches of said locking lever corresponding thereto to lock said plunger of said right (or left) solenoid, said plunger being released from its locked condition by sliding said sliding plate in a direction to disengage said magnetic head means from said magnetic tape in such a manner that said locking lever is pushed by said engaging lever of said sliding plate against said second spring means.

5. A magnetic recording and reproducing apparatus as claimed in claim 4, wherein said locking lever has tapered faces at both ends thereof for sliding contact with said pins respectively, one of said tapered faces extending from one free end face of said locking lever toward the outer upper end of said U-shaped notch and the other tapered face extending from the other free end face toward the outer lower end of said inverted U-shaped notch, and when said left (or right) solenoid is energized after said right (or left) plunger is brought into its locked condition, said pin on said plunger of said left (or right) solenoid is moved into sliding contact with one of said tapered faces corresponding thereto to rotate said locking lever against said second spring means to release said plunger of said right (or left) solenoid from its locked condition and then said pin on said plunger of said left (or right) solenoid is engaged with the other of said notches of said locking lever corresponding thereto to lock said plunger of said left (or right) solenoid.

6. A magnetic recording and reproducing apparatus as claimed in claim 4, wherein said right and left actuating means include springs respectively and said right and left pinch roller arms are rotated through said springs respectively when said right and left actuating means are actuated by the energization of said plungers of said right and left solenoids.

7. A magnetic recording and reproducing apparatus as claimed in claim 4, which further comprises right and left capstan wheels affixed to said right and left capstans respectively, right and left reel wheels affixed to said right and left reel shafts respectively, and right and left idlers mounted on right and left idler arms respectively, said right and left idler arms being associated with said right and left actuating means respectively and said right (or left) idler being brought into rotary contact with said right (or left) capstan wheel and said right (or left) reel wheel to drive said right (or left) reel when said right (or left) solenoid is energized.

References Cited

UNITED STATES PATENTS

| | | | |
|---|---|---|---|
| 3,417,938 | 12/1968 | Markakis et al. | 274—4 E |
| 3,070,321 | 12/1962 | Bara | 242—189 |
| 3,127,178 | 3/1964 | Osborne et al. | 274—4 F |
| 3,217,996 | 11/1965 | Bernier | 226—50 |
| 3,475,563 | 10/1969 | Papst | 242—198 |
| 3,490,666 | 1/1970 | Takashino | 226—50 X |
| 3,533,633 | 10/1970 | Wilder | 274—4 D |

HARRY N. HAROIAN, Primary Examiner